(12) United States Patent
Bilodeau

(10) Patent No.: US 7,707,845 B2
(45) Date of Patent: May 4, 2010

(54) CLIMATE CONTROL SYSTEM FOR VEHICLE BERTHS AND CABS

(75) Inventor: Stéphane Bilodeau, Sherbrooke (CA)

(73) Assignee: Groupe Énerstat Inc., Sherbrooke, Québec (CA)

( * ) Notice: Subject to any disclaimer, the term of this patent is extended or adjusted under 35 U.S.C. 154(b) by 354 days.

(21) Appl. No.: 11/574,349

(22) PCT Filed: Aug. 31, 2005

(86) PCT No.: PCT/CA2005/001334

§ 371 (c)(1),
(2), (4) Date: Feb. 27, 2007

(87) PCT Pub. No.: WO2006/024168

PCT Pub. Date: Mar. 9, 2006

(65) Prior Publication Data

US 2008/0041082 A1 Feb. 21, 2008

Related U.S. Application Data

(60) Provisional application No. 60/605,507, filed on Aug. 31, 2004.

(51) Int. Cl.
*F25B 1/00* (2006.01)
*F25B 41/00* (2006.01)
*F25D 17/02* (2006.01)
(52) U.S. Cl. ............... 62/230; 62/244; 62/434; 62/513; 165/42
(58) Field of Classification Search ............. 62/230, 62/430, 434, 244, 513; 165/42
See application file for complete search history.

(56) References Cited

U.S. PATENT DOCUMENTS

| 4,761,967 | A | * | 8/1988 | Sumikawa et al. ............ 62/201 |
| 4,958,766 | A | | 9/1990 | Tóth et al. |
| 5,265,437 | A | | 11/1993 | Saperstein et al. |
| 5,277,038 | A | * | 1/1994 | Carr ............................ 62/434 |
| 5,501,267 | A | | 3/1996 | Iritani et al. |
| 5,553,662 | A | | 9/1996 | Longardner et al. |
| 6,038,877 | A | | 3/2000 | Peiffer et al. |
| 6,112,543 | A | | 9/2000 | Feuerecker et al. |
| 6,260,376 | B1 | | 7/2001 | Khelifa et al. |
| 6,457,324 | B2 | | 10/2002 | Zeigler et al. |
| 6,460,356 | B1 | | 10/2002 | Tao et al. |
| 6,640,889 | B1 | * | 11/2003 | Harte et al. ................. 165/202 |
| 6,889,762 | B2 | * | 5/2005 | Zeigler et al. ................ 165/240 |

* cited by examiner

*Primary Examiner*—Marc E Norman
(74) *Attorney, Agent, or Firm*—Ogilvy Renault LLP

(57) ABSTRACT

A climate control system (10) for a cab/berth of a vehicle, comprises a climate control circuit (12) in which a first refrigerant circulates between at least an energy accumulator (20) in which an accumulator refrigerant is in heat exchange with the first refrigerant, a radiator (22) in the cab/berth to adjust a temperature of the cab/berth, and a heat-exchange unit (23). A refrigeration circuit (14) is provided for submitting a second refrigerant to a refrigeration cycle. An evaporation stage (43) is in heat-exchange relation with the heat-exchange unit (23) of the climate control circuit (12) such that the second refrigerant absorbs heat from the first refrigerant. A controller system (50) is powered by an electric power source (A) of the vehicle and selectively actuates the climate control circuit and the refrigeration circuit (14) so as to store cold or hot energy in the energy accumulator (20) when the electric power source (A) is charged, and selectively actuates the climate control circuit (12) to cool the cab/berth with the radiator (22).

12 Claims, 3 Drawing Sheets

CLIMATE CONTROL SYSTEM FOR VEHICLE BERTHS AND CABS

CROSS-REFERENCE TO RELATED APPLICATION

The present patent application claims priority on U.S. Provisional Patent Application No. 60/605,507, filed on Aug. 31, 2004.

BACKGROUND OF THE INVENTION

1. Field of the Invention

The present invention generally relates to ventilation systems for vehicles and, more particularly, to a heating and air-conditioning system for berths and cabs of a plurality of types of vehicles.

2. Background Art

Cabs of road transport vehicles are often equipped with sleeper berths, which consist of resting accommodations for the driver. Road transport vehicles often travel over long distances, whereby sleeper berths are provided for the driver to recuperate. Similarly, recreational vehicles have self-contained living berths for the vehicle occupants.

In order to maintain suitable climate conditions, sleeper berths and living berths are typically provided with HVAC systems (i.e., heating, ventilating and air-conditioning systems) that treat, heat and/or cool the air that is fed to the berths/cabs, so as to provide adequate resting conditions for its occupants.

Berths, and cabs of specific types of vehicle (e.g., cranes, service vehicles, buses, cars and other passenger vehicles), often accommodate occupants while the engine is turned off as well as when the vehicle is in operation. Accordingly, the actuation of such ventilation systems is of concern, in that the engine may be turned off while the HVAC systems has to work, whereby the alternator associated with the engine does not maintain the voltage level of the electrical systems of these vehicles. In various instances, no external power supply is available, whereby some ventilation systems of berths and cabs are powered by the electrical system of the vehicle. In order to avoid the discharge of the batteries of the electrical systems while heating or cooling berths or cabs, vehicle engines are kept on so as to keep, for instance, the alternator in a charging mode for the electrical system.

Accordingly, some uses of such ventilation systems involve vehicle fuel consumption, either by requiring that the engine be turned on to operate, or by affecting the performance of the vehicle by being mechanically related to the engine. This results in combustion by-product emissions. Therefore, not only are such ventilation systems costly to operate because of fuel consumption, they also have a negative effect on the environment.

SUMMARY OF INVENTION

It is an aim of the present invention to provide a novel HVAC system for sleeper berths and cabs of vehicles.

It is an aim of the present invention to provide a HVAC system for sleeper berths and cabs of vehicles that addresses issues associated with the prior art.

Therefore, in accordance with the present invention, there is provided a climate control system for a cab/berth of a vehicle, comprising: a climate control circuit in which a first refrigerant circulates between at least an energy accumulator in which an accumulator refrigerant is in heat exchange with the first refrigerant, a radiator in which the first refrigerant is in heat exchange with a fluid blown in the cab/berth to adjust a temperature of the cab/berth, and a heat-exchange unit; a refrigeration circuit in which a second refrigerant circulates between a compression stage, a condensation stage, an expansion stage and an evaporation stage for submitting the second refrigerant to a refrigeration cycle, the compression stage having at least one electrically powered compressor, and the evaporation stage being in heat-exchange relation with the heat-exchange unit of the climate control circuit such that the second refrigerant absorbs heat from the first refrigerant; and a controller system powered by an electric power source of the vehicle and selectively actuating the climate control circuit and the refrigeration circuit so as to store cold energy in the energy accumulator when the vehicle is turned on and charges the electric power source, and selectively actuating the climate control circuit to cool the fluid blown in the cab/berth with the radiator.

Further in accordance with the present invention, there is provided a climate control system for a cab/berth of a vehicle, comprising: an operator interface for receiving a set point temperature for the cab/berth from an operator; a climate control circuit in which a first refrigerant circulates between at least an energy accumulator in which an accumulator refrigerant is in heat exchange with the first refrigerant, a heating unit to heat the first refrigerant, a radiator in which the first refrigerant is in heat exchange with a fluid blown in the cab/berth to adjust a temperature of the cab/berth, and a heat-exchange unit; a refrigeration circuit in which a second refrigerant circulates between a compression stage, a condensation stage, an expansion stage and an evaporation stage for submitting the second refrigerant to a refrigeration cycle, the evaporation stage being in heat-exchange relation with the heat-exchange unit of the climate control circuit such that the second refrigerant absorbs heat from the first refrigerant; sensors to monitor at least a temperature of the accumulator refrigerant, an outdoor temperature, and a cab/berth temperature; an energy level calculator associated with the sensors to calculate a required energy level of the energy accumulator as a function of temperature readings of the sensors; and an operation controller connected to the electric power source of the vehicle and connected to the energy level calculator, the operation controller being provided for one of (1) actuating the refrigeration circuit and the climate control circuit without the heating unit to store cold energy in the energy accumulator, and (2) actuating the climate control circuit with the heating unit to store hot energy in the energy accumulator, with operations (1) and (2) being selected as a function of the energy level of the energy accumulator and of the set point temperature, and for (3) actuating the climate control circuit to treat the fluid blown in the cab/berth by circulating the first refrigerant in the radiator.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
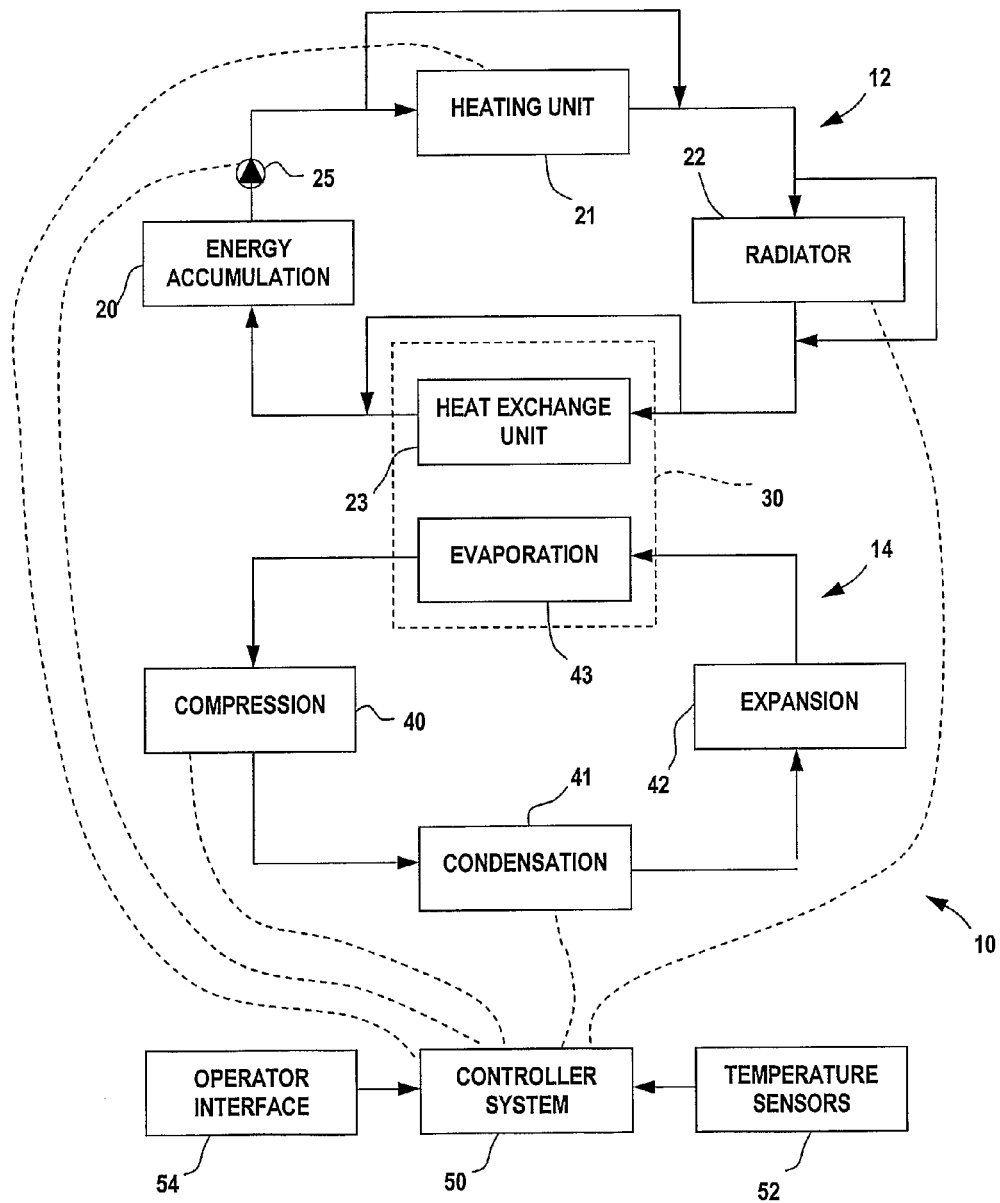
FIG. 1 is a schematic view of a climate control system in accordance with a preferred embodiment of the present invention.

Referring to the drawings, and more particularly to FIG. 1, a climate control system in accordance with a preferred embodiment of the present invention is generally shown at 10. The climate control system 10 generally has a climate control circuit 12 and a refrigeration circuit 14.

Climate Control Circuit 12

The climate control circuit 12 is used to heat or cool air being supplied to a sleeper berth, or other such self-contained volume of a vehicle in which climate control is required. The climate control circuit 12 is a closed circuit in which circulates a first refrigerant. The climate control circuit 12 generally has four stages, interrelated by a piping network. More specifically, the climate control circuit 12 has an energy accumulator 20, a heating unit 21, a radiator 22, and a heat-exchange unit 23.

The energy accumulator 20 has a reservoir in which an accumulator refrigerant accumulates energy, and a heat exchanger (e.g., coils) by which the first refrigerant of the climate control circuit 12 is in heat-exchange relation with the accumulator refrigerant. The accumulator refrigerant in the energy accumulator 20 is either in a cooled state, when it is required to cool the air of the berth, or in a heated state, when it is required to heat the air of the berth. The accumulator refrigerant is preferably chosen so as to change phases in the operative temperatures of the climate control circuit 12, as will be described hereinafter.

The heating unit 21 is in fluid communication with the energy accumulator 20 so as to receive an inflow of the first refrigerant, and is positioned downstream of the energy accumulator 20. The heating unit 21 is used to heat the first refrigerant fed from the energy accumulator 20. It may not be required to heat the first refrigerant, whereby the heating unit 21 may be by-passed, as illustrated in FIG. 1.

The heating unit 21 typically has electric coils so as to receive power from the electric circuit of the vehicle. It is also contemplated to provide combustion heating to the heating unit 21, as an alternative to the electric coils or a backing heat source, especially for cold weather. In the event that combustion heating is provided, the fuel may be collected from the fuel system of the engine of the vehicle. For instance, a fuel conduit relating the combustion heater of the heating unit 21 to the fuel system of the engine may tap into standard ports in the fuel reservoir of the vehicle. Alternatively, small fuel tanks may be associated to the heating unit 21.

The radiator 22 is positioned downstream of the heating unit 21, and receives a flow of the first refrigerant from the heating unit 21, or from the energy accumulator 20 if the heating unit 21 is by-passed. The radiator 22 creates a flow of air therethrough, with which the first refrigerant passing through the radiator 22 is in heat exchange, whereby the air is heated or cooled, according to the climate conditions that are required in the berth.

The heat-exchange unit 23 is positioned downstream of the radiator 22 and upstream of the energy accumulator 20, and may be by-passed. The heat-exchange unit 23 interrelates the climate control circuit 12 to the refrigeration circuit 14. More specifically, the first refrigerant circulating through the heat-exchange unit 23 will release heat to a refrigerant (i.e., the second refrigerant) circulating in the refrigeration circuit 14. The heat-exchange unit 23 is used when climate control of the berth requires cooling of the air (e.g., air conditioning within the berth). Accordingly, the heat-exchange unit 23 may be by-passed when air conditioning is not required.

The first refrigerant will circulate through the climate control circuit 12 to reach the required stages described above. A flow-creating means (e.g., a pump) is illustrated at 25 to cause the circulation of the first refrigerant through the climate control circuit 12. It is pointed out that the sequence of stages of the climate control circuit 12 may vary. For instance, the heating unit 21 may be positioned upstream of the accumulator 20, etc.

Refrigeration Circuit 14

Referring to FIG. 1, the refrigeration circuit 14 is used to absorb heat from the first refrigerant of the climate control circuit 12 when air conditioning is or will be required in the berth (i.e., when cool must be stored for subsequent use of air conditioning in the berth).

The refrigeration circuit 14 is a closed circuit in which circulates a second refrigerant in a complete refrigeration cycle. The refrigeration circuit 14 has four stages in a fluid communication sequence, namely a compression stage 40, a condensation stage 41, an expansion stage 42, and an evaporation stage 43.

The compression stage 40 typically has a compressor that compresses the second refrigerant to a high-pressure gas state as a function of the temperature of a cooling medium (e.g., air) that will be blown across the condensation stage. It is contemplated to use an electrically powered compressor in the compression stage 40. More specifically, such a compressor can be connected to an electrical power source (e.g., electrical system of the vehicle, battery associated with the climate control system 10) as opposed to being mechanically connected to the engine (e.g., by way of a belt). Mechanically connected compressors have been shown to affect the performance of the engine. Suitable electrically powered compressors include non-exclusively centrifugal and/or rotary-type compressors, but reciprocal and/or screw-type and/or other compressors may also be used with the climate control system 10.

The condensation stage 41 is positioned downstream of the compression stage 40, and receives a flow of the second refrigerant in the high-pressure gas state from the compression stage 40. The condensation stage 41 typically has a condenser, in which the second refrigerant, in its high-pressure gas state, is in a heat-exchange relation with a medium (e.g., outside air). The medium is for instance blown on the condenser of the condensation stage 41 such that heat is released from the second refrigerant, whereby the second refrigerant reaches a high-pressure liquid state.

The expansion stage 42 is positioned downstream of the condensation stage 41, and receives a flow of the second refrigerant in its high-pressure liquid state. The expansion stage 42 creates a pressure drop for the second refrigerant, such that the second refrigerant generally exits the expansion stage 42 in a low-pressure liquid state. The expansion stage 42 typically involves an expansion valve (e.g., thermostatic expansion valve), but may also use capillary tubes or pre-calibrated expansion ports.

The evaporation stage 43 is positioned downstream of the expansion stage 42, and is in fluid communication therewith. The second refrigerant reaches the evaporation stage 43 in its low-pressure liquid state. The evaporation stage 43 has an evaporator that is in heat-exchange relation with the heat-exchange unit 23, whereby the second refrigerant of the refrigeration circuit 14, will absorb heat from the first refrigerant in the climate control circuit 12.

As it absorbs heat in the evaporation stage 43, the second refrigerant will reach a low-pressure gas state. The compression stage 40 is positioned downstream of the evaporation stage 43, and receives the flow of second refrigerant in the low-pressure gas state, whereby the refrigeration cycle is completed.

Refrigerants

In the present description, the expression refrigerant is generically used to describe a fluid or solid that is provided to absorb or release heat in the climate control system 10. The climate control system 10 of the present invention has the first refrigerant in the climate control circuit 12, the second refrigerant in the refrigeration circuit 14, and the accumulator refrigerant in the energy accumulator 20.

The first refrigerant is a heat conductor fluid that reaches a set point temperature in view of being fed to the radiator 22, to heat or cool the air supplied to the berth. For instance, the first refrigerant typically is an alcohol-based fluid, such as glycol, or simply water.

When the climate control system 10 operates in air conditioning, the first refrigerant releases heat to the second refrigerant at the heat-exchange unit 23, and/or to the accumulator refrigerant at the energy accumulator 20. The first refrigerant absorbs heat from the air blown on the radiator 22 when the climate control system 10 operates in air conditioning.

When the climate control system 10 operates in heating, the first refrigerant absorbs heat from the heating unit 21, and/or from the energy accumulator 20. The first refrigerant releases heat to the air blown on the radiator 22 when the climate control system 10 operates in heating.

The accumulator refrigerant is chosen so as to change phase (e.g., solid to liquid, liquid to gas or vice-versa) under generally atmospheric pressure within the energy accumulator 20, following a heat-exchange sequence with the first refrigerant. It is preferred that the accumulator refrigerant undergo a phase change (e.g., liquid-solid and vice versa) as a function of the temperature variation required for the first refrigerant, so as to maximize the heat-retaining capacity of the energy accumulator 20 by using the latent heat capacity of the accumulator refrigerant.

The accumulator refrigerant is a compound of different materials which may include alkanes, N-paraffin hydrocarbon chain, glycerin, tridecane, tetradecanes, pentadecane, Hexadecane, Heptadecane, Hydrocarbon wax, glycerol, 1,2, 3-Propanetriol.

The second refrigerant undergoes a complete refrigeration cycle during the operation of the refrigeration circuit 14. The second refrigerant is compressed at the compression stage 40 so as to change phase (i.e., gas to liquid) at the condensation stage 41, in releasing heat to air being blown thereon (e.g., ambient air, outside air). Moreover, upon being expanded, the second refrigerant changes phase (i.e., from liquid to gas), to absorb heat from the first refrigerant.

The second refrigerant typically consists of a hydrocarbon-based fluid or the like, adapted to be compressed to operate in a temperature variation range of up to 60° C.

Air-Conditioning Operation

The compression stage 40 is the stage of the climate control system 10 which requires the most work. Moreover, considering that the berth does not require air conditioning during operation of the road vehicle, the refrigeration circuit 14 is used during transit of the vehicle to cool the accumulator refrigerant of the climate control circuit 12, so as to accumulate cooling energy in the energy accumulator 20, in view of the subsequent air-conditioning needs of the berth.

Therefore, a refrigeration cycle is operated with the refrigeration circuit 14, such that the second refrigerant within the refrigeration circuit 14 absorbs heat from the first refrigerant within the climate control circuit 12. As discussed previously, this heat exchange occurs at the heat-exchange unit 23. The first refrigerant simultaneously circulates in the climate control circuit 12, such that the cool state of the first refrigerant downstream of the heat-exchange unit 23 is used to absorb heat from the accumulator refrigerant in the energy accumulator 20.

Once the amount of energy accumulated by the accumulator refrigerant is maximized, refrigerant circulation in both the climate control circuit 12 and the refrigeration circuit 14 is stopped.

When there is a need for air-conditioning within the berth, the climate control circuit 12 operates individually, by inducing circulation of the first refrigerant therein. The first refrigerant absorbs heat from the air blown on the radiator 22, and releases this heat to the accumulator refrigerant in the energy accumulator 20.

Accordingly, the electrical power requirements of the climate control system 10 during air-conditioning operation are minimized, by the fact that cooling energy has been accumulated in the energy accumulator 20 while the vehicle is in transit (with the power source being recharged by alternator, as will be described hereinafter).

However, the refrigeration circuit 14 may be operated if the cooling energy level in the energy accumulator 20 reaches low limits. In such a case, the climate control circuit 12 and the refrigeration circuit 14 circulate their respective refrigerants simultaneously, whereby the second refrigerant in the refrigeration circuit 14 absorbs heat from the first refrigerant in the climate control circuit 12, as described above. The first refrigerant in the climate control circuit 12 is used to restore the cooling energy levels of the energy accumulator 20, and/or to absorb heat from the air blown on the radiator 22.

During air-conditioning operation of the climate control system 10, the heating unit 21 is typically by-passed (e.g., by allowing the first refrigerant to pass therethrough while being turned off).

Heating Operation

During use of the climate control system 10 for heating, the refrigeration circuit 14 is inoperative. Considering that the berth does not require heating during transit of the vehicle, the climate control circuit 12 is preferably used during transit to heat the accumulator refrigerant, so as to accumulate heating energy in the energy accumulator 20, in view of the subsequent heating needs of the berth.

Therefore, the first refrigerant is circulated in the climate control circuit 12, so as to absorb heat from the heating unit 21. The radiator 22 and the heat-exchange unit 23 are by-passed, and the first refrigerant reaches the energy accumulator 20, where the first refrigerant will release heat to the accumulator refrigerant.

When the vehicle is parked and it is required to heat the berth, the radiator 22 is turned on such that air is blown into heat exchange with the first refrigerant circulating in the climate control circuit 12. The air is then supplied to the berth having been heated by the first refrigerant in the radiator 22.

The first refrigerant then reaches the energy accumulator 20, after by-passing the heat-exchange unit 23, so as to absorb heat from the accumulator refrigerant in the energy accumulator 20.

Considering that the accumulator refrigerant is chosen so as to change phase at an optimal phase-change set point in view of air conditioning, the temperature of the first refrigerant at the outlet of the energy accumulator 20 may be too low for severe heating purposes. Therefore, if necessary, the heating unit 21 is turned on in order to complete the heating of the first refrigerant, for the subsequent feed to the radiator 22.

Moreover, in colder weather, the previously discussed backing combustion heater may be used to further heat the first refrigerant circulating through the heating unit 21.

When the energy accumulator 20 reaches low heating energy levels, it is contemplated to by-pass the radiator 22 (e.g., by stopping the air flow thereon), such that the first refrigerant reaches the energy accumulator 20 in a suitably hot state to release heat to the accumulator refrigerant.

It is pointed out that both the air-conditioning and the heating operations accumulate energy during transit of the vehicle, using electric power, whereby the source of electric power is recharged by the alternator of the vehicle. The energy accumulation thereafter enables the climate control system 10 to operate with relatively low energy consumption when the vehicle is parked with the engine turned off.

Controller System 50

Referring to FIG. 1, a plurality of the components of the climate control system 10 are actuated in various steps of the operation of the system 10. Accordingly, a controller system 50 is connected to the various electrically powered components of the climate control system 10, so as to control and direct the various operations of the system 10.

The controller system 50 receives information by which the various operating parameters of the system 10 will be influenced. As shown in FIG. 1, temperature sensors 52 are connected to the controller system 50 so as to provide information such as the cab temperature (e.g., in the cab, or at the outlet of the radiator 22), the outdoor temperature, and/or the temperature of the refrigerants (first refrigerant, second refrigerant and accumulator refrigerant).

The controller system 50 is also connected to operator interfaces 54, by which the occupant of the vehicle may select cab climate conditions.

The controller system 50 therefore automatically controls the operation of all actuated components of the climate control system 10 to adjust the desired climate conditions of the cab in which the climate control system 10 is used.

Figure 2:
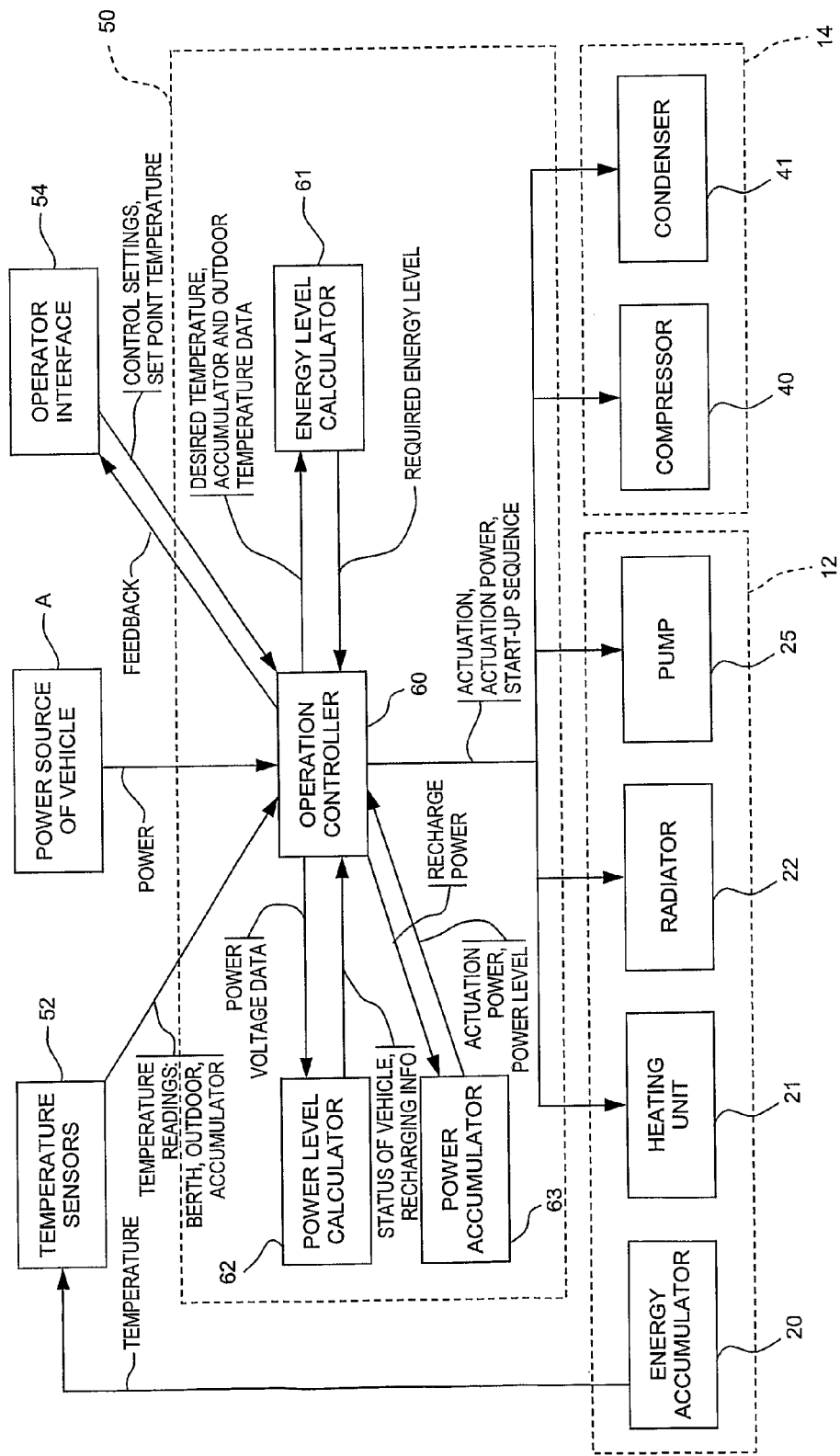
FIG. 2 is a schematic view of a controller system associated with the climate control system of FIG. 1.

More specifically, referring to FIG. 2, the controller system 50, its components and its interactions with the components of the climate control system 10 are shown in greater detail. The controller system 50 is typically a processing unit (e.g., CPU, processor chip, computer or the like), having an operation controller 60.

The operation controller 60 receives information from a plurality of sources from the berth, the surroundings of the berth, and the climate control system 10, and communicates the information to various calculators. The calculators will then return information to the operation controller 60, which will prompt the operation controller 60 to actuate components of the climate control system 10 as a response to the acquired data, so as to respond to a demand from the operator of the interface 54 with regard to climate control in the berth.

In an embodiment, the operator of the berth decides on the conditions in the berth (i.e., a set point temperature). This decision is typically made prior to the vehicle being turned off. The operator communicates with the operation controller 60 of the controller system 50 by way of the operator interface 54.

The operation controller 60 must then verify the status of the various components of the climate control system 10, as well as other factors, to determine what actions need to be done in order to respond to the operator's set point temperature setting in the berth.

The climate control system 10 is primarily regarded as an energy accumulator. More specifically, the climate control system 10 is selectively operated to store energy when electrical power is available and reproducible (by the alternator of the vehicle), so as be energy-efficient by being as energy-independent as possible. Moreover, it is preferred to operate the climate control system 10 off the electrical system of a vehicle when the operation of the climate control system 10 will not affect the performance of the vehicle (i.e., when vehicle battery voltage is high enough) for the alternator to maintain the power level of the battery at its level while supplying power to the climate control system 10.

As described previously, the climate control circuit 12 has the energy accumulator 20 consisting of a reservoir with the accumulator refrigerant (e.g., phase-changing refrigerant). It must be calculated how much energy must be accumulated in the energy accumulator 20 (e.g., what temperature the accumulator refrigerant should reach) as a function of the set point temperature requested by the operator of the berth.

Accordingly, one of the temperature sensors 52 is associated with the energy accumulator 20 so as to monitor the temperature of the accumulator refrigerant. The temperature data is communicated to the operation controller 60, along with other temperature information, potentially required in the calculation of the energy transfer required. For instance, outdoor air temperature and berth temperature information is provided.

An energy level calculator 61 is provided in the controller system 50, and is associated with the operation controller 60. More specifically, the energy level calculator 61 receives the temperature data from the operation controller 60 (e.g., temperature of the refrigerant in the energy accumulator 20, outdoor temperature, berth temperature), as well as the set point temperature requested by the operator of the berth through the operator interface 54.

As a response to the information received, the energy level calculator 61 will calculate the required energy level for the energy accumulator 20 to satisfy the temperature setting within the berth, as requested by the operator.

In view of the required energy level for the accumulator 20, the operation controller 60 will then actuate the various components of the climate control circuit 12 and/or the refrigeration circuit 14, so as to store energy for the subsequent air/conditioning or heating operations when the vehicle is turned off.

The operation controller 60 is connected to the power source A of the vehicle, so as to receive power. It is pointed out that the operation controller 60 has all necessary electrical components for receiving power and transmitting power to the components of the climate control circuit 12 and the refrigeration circuit 14.

The controller system 50 also has a power level calculator 62. The power level calculator 62 is associated with the operation controller 60. The power level calculator 62 is provided to determine the power level of a power accumulator 63 (e.g., battery) of the controller system 50, and the power level of the power source A. The power level calculator 62 can also determine the status of the vehicle (i.e., whether the vehicle is running or turned off) by receiving voltage data of the power source A from the controller 60. For instance, it is contemplated to measure the voltage of the power source A. When the alternator of the vehicle charges the power source A (i.e., during operation of the vehicle), the voltage is typically higher than 12 V, whereby it can be determined from the voltage measurement whether the vehicle is operative or not.

The power accumulator 63 is typically a battery that will be the main power source of the climate control system 10 when the vehicle is turned off. More specifically, the power source A of the vehicle primarily serves to enable the vehicle to operate. Accordingly the controller system 50 has the power accumulator 63 to serve as a power source for the various components of the climate control circuit 12, the refrigeration circuit 14 and the controller system 50 when the vehicle is turned off. The power accumulator 63 gets recharged when the vehicle is running, by the power source A of the vehicle.

When the vehicle is turned off and it is required to operate the climate control system 10 in air conditioning or heating to maintain the climate within the berth to the set point temperature, the operation controller 60 actuates the various components of the climate control system 12 and the refrigeration system 14.

For instance, during air-conditioning operation (as described above) with a suitable power level in the power accumulator 63, the radiator 22 and the pump 25 of the climate control circuit 12 must be actuated in order for the first refrigerant to release heat in the energy accumulator 20 and absorb heat at the radiator 22. Both are powered by the power accumulator 63 through the operation controller 60, and temperature readings are provided throughout the operation by the temperature sensors 52, to monitor the energy level within the energy accumulator 20.

During heating operation (as described above) with a suitable power level in the power accumulator 63, the radiator 22 and the pump 25 must be actuated in order for the first refrigerant to absorb heat in the energy accumulator 20 and release heat at the radiator 22. The heating unit 21 may be solicited to further heat the first refrigerant, either by being electrically powered by the power accumulator 63, or by using fuel from the vehicle.

By monitoring the temperature in the energy accumulator 20, it may be determined by the energy level calculator 61 that the energy level will not enable the climate control system 10 to maintain the set point temperature in the cab. It may therefore be required to recharge the energy level of the energy accumulator 20. When the climate control system 10 is recharging the energy accumulator 20, for instance by operation of the refrigeration circuit 14 for air conditioning of the berth, additional components of the system 10 are actuated, such as the compressor of the compression stage 40, and fans of the condensation stage 41. The climate control circuit 12 can be used to heat/cool the berth with the radiator 22 when energy is being accumulated in the energy accumulator 20.

During extended actuation of the air-conditioning operation, the level of energy accumulated within the energy accumulator 20 decreases, whereby it may be required to release some energy from the energy accumulator 20, by reactivating momentarily the refrigeration circuit 14, to release the energy accumulated in the energy accumulator 20 via the second refrigerant in the refrigeration circuit 14.

Therefore, the first refrigerant and the second refrigerant are both circulated in their respective circuits, such that the second refrigerant absorbs heat from the first refrigerant in the heat-exchange unit 23, by heat-exchange relation 30. The first refrigerant then circulates in the climate control circuit 12 to absorb some heat from the accumulator refrigerant in the energy accumulator 20, and also from the fluid that is blown on the radiator 22, so as to cool the cab.

When a sufficient amount of energy has been released from the energy accumulator 20 (e.g., as determined by the controller system 50 from the end of a predetermined time period, or from the energy level calculated by the energy level calculator 61), the refrigeration circuit 14 may be shut off.

The power level calculator 62 continuously monitors the power level of the power accumulator 63 to ensure the power level is high enough to enable operation of the climate control system 10.

Figure 3:
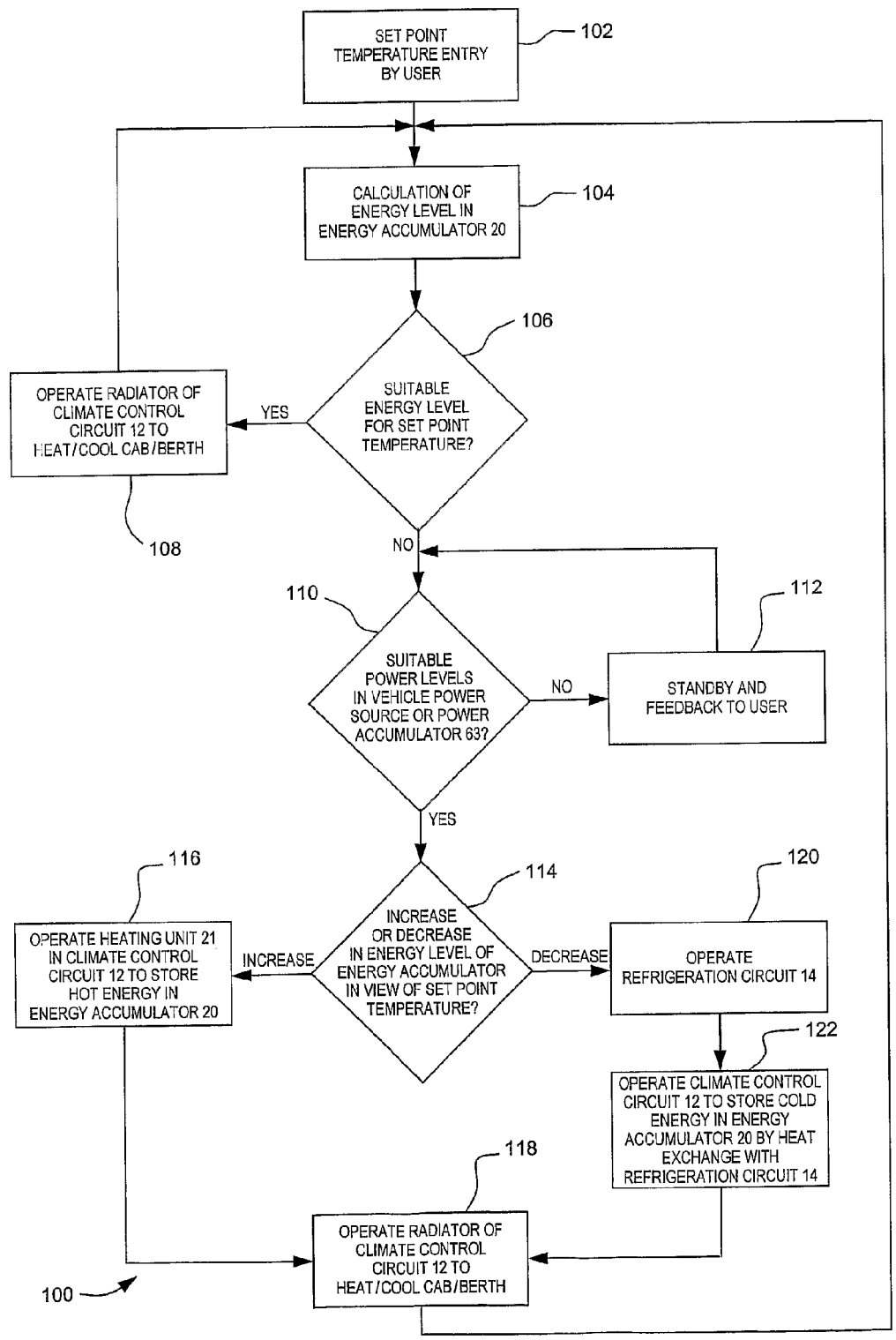
FIG. 3 is a flowchart illustrating an operation of the controller system in hearing/cooling a cab/berth of a vehicle.

As an example, a method of operation of the controller system 50 is illustrated at 100 in FIG. 3. The method 100 is a typical illustration of the logic of the controller system 50 as a response to the setting of a set point temperature by the user.

In Step 102, a set point temperature is entered by the user. It is pointed out that the user may allow the controller system 50 to decide whether the system should store energy for air conditioning or heating, as a function of temperature data provided by the temperature sensors 52.

Once the set point temperature has been entered by the user in Step 102, a calculation of the energy level in energy accumulator 20 is performed in Step 104. The calculation of the energy level (e.g., required temperature for the accumulator refrigerant) is calculated by the energy level calculator 61 as a function of temperature data provided by the temperature sensors 52.

In Decision 106, the operation controller 60 will determine whether the energy level, as provided by the energy level calculator 61, is suitable for the set point temperature chosen by the user.

If so, Step 108 follows, in which the radiator 22 of the climate control circuit 12 is operated to heat or cool the cab/berth. If not, energy should be accumulated in the energy accumulator 20, either in the form of cold energy of hot energy.

Accordingly, in Decision 110, the power levels of the vehicle power source and of the power accumulator 63 must be calculated, by the power level calculators 62, in order to determine how the climate control system 10 will be powered.

As mentioned previously, it is preferred to use the electrical power of the power source A of the vehicle when the power is being regenerated, for instance, by way of an alternator. If the vehicle is turned off, it may be required to operate the climate control system 10 off the energy accumulated in the power accumulator 63.

If both the power source A and the power accumulator 63 do not have sufficient power levels available, as calculated by the power level calculator 62, to restore energy levels in the energy accumulator 20 as a function of the set point temperature, the controller system 50 will go to Step 112, in which the system will be on standby and provide feedback to the user as to the low power levels of the power source A and of the power accumulator 63.

If any one of the power source A, as preferred, and the power accumulator 63, has sufficient power level to actuate the climate control system 10, Decision 114 follows, in which it is determined whether the energy level must be increased (hot energy) or decreased (cold energy) in the energy accumulator 20 in view of the set point temperature.

If it is required to store hot energy in the energy accumulators 20, the method 100 goes to Step 116, in which the heating unit 21 is operated in the climate control circuit 12, so as to store energy in the energy accumulator 20.

Subsequently, or concurrently, Step 118 has the radiator of the climate control circuit 12 operated so as to heat/cool the cab or berth. Thereafter, the method 100 continuously leads back to the Step 104, so as to continuously monitor the energy level in the energy accumulator 20.

If it is required to decrease the energy level in the energy accumulator 20, for air-conditioning purposes, Step 120 has the refrigeration circuit 14 operated. Step 122 is performed concurrently so as to circulate the first refrigerant in the climate control circuit 12, so as to store cold energy in the energy accumulator 20 by heat exchange with the second refrigerant in the refrigeration circuit 14.

Step 118, as described previously, is performed subsequently to or concurrently with Steps 120 and 122.

As the refrigeration circuit 14 requires a non-negligible amount of power to operate its components (e.g., the compressor of the compression stage 40), the operation controller 60 is programmed with a sequence of operation for turning on the various components of the refrigeration circuit 14 operating off the power accumulator 63.

For instance, the controller system 50 is typically provided with an inverter to provide suitable voltage to the compressor of the compression stage 40. Also, to limit the effects of the start of the compressor on the batteries at a moment when the alternator of the engine is turned off, capacitors are provided in the controller system 50.

In a contemplated sequence to start the refrigeration circuit 14 when only the radiator 22 and the pump 25 of the climate control circuit 12 are operating, the inverter is turned on. A start capacitor associated with the operation controller 60 is then charged, followed by the charging of a run capacitor, also associated with the operation controller 60.

When both capacitors are charged, the compressor 40 may be turned on, followed by the fans of the condenser 41, so as to restore the energy level in the energy accumulator 20. When the energy accumulator 20 reaches a suitable energy level, or when a predetermined time period expires, the compressor 40 and the fans of the condenser 41 are turned off, followed by the inverter.

It is contemplated to provide the climate control system 10 in any type of vehicles. Although the preferred use of the climate control system 10 is for vehicles of the type accommodating occupants when the vehicle is turned off (e.g., sleeper berths, crane cabs, and the like), typical vehicles, such as cars, buses, boats, trains and other passenger vehicles can be provided with the climate control system 10.

Moreover, hybrid vehicles having both a combustion engine and an electric motor can use the climate control system 10. In such a case, it is preferred to use electrical power as being produced by the alternator during operation of the combustion engine. In electric vehicles, the climate control system 10 can also be used, but is connected to the batteries of the electric vehicles to operate.

It is within the ambit of the present invention to cover any obvious modifications of the embodiments described herein, provided such modifications fall within the scope of the appended claims.

The invention claimed is:

1. A climate control system for a cab/berth of a vehicle, comprising:
    an energy accumulator enclosing an accumulator refrigerant;
    a climate control circuit in which a first refrigerant different from the accumulator refrigerant circulates between at least the energy accumulator in which the accumulator refrigerant is isolated from and in heat exchange with the first refrigerant, a radiator in which the first refrigerant is in heat exchange with a fluid blown in the cab/berth to adjust a temperature of the cab/berth, and a heat-exchange unit;
    a refrigeration circuit in which a second refrigerant different from the accumulator refrigerant circulates between a compression stage, a condensation stage, an expansion stage and an evaporation stage for submitting the second refrigerant to a refrigeration cycle, the compression stage having at least one electrically powered compressor, and the evaporation stage being in direct heat-exchange relation with the heat-exchange unit of the climate control circuit such that the second refrigerant absorbs heat from the first refrigerant; and
    a controller system powered by an electric power source of the vehicle and selectively actuating the climate control circuit and the refrigeration circuit so as to store cold energy in the energy accumulator when the vehicle is turned on and charges the electric power source, and selectively actuating the climate control circuit to cool the fluid blown in the cab/berth with the radiator.

2. The climate control system according to claim 1, wherein the climate control circuit has a heating unit, and the controller system is adapted to selectively store hot energy in the energy accumulator, and actuate the climate control circuit to heat the fluid blown in the cab/berth with the radiator.

3. The climate control system according to claim 1, wherein the accumulator refrigerant changes phase when storing cold energy.

4. A climate control system for a cab/berth of a vehicle, comprising:
    an operator interface for receiving a set point temperature for the cab/berth from an operator;
    an energy accumulator enclosing an accumulator refrigerant;
    a climate control circuit in which a first refrigerant different and isolated from the accumulator refrigerant circulates between at least the energy accumulator in which the accumulator refrigerant is in heat exchange with the first refrigerant, a heating unit to heat the first refrigerant, a radiator in which the first refrigerant is in heat exchange with a fluid blown in the cab/berth to adjust a temperature of the cab/berth, and a heat-exchange unit;
    a refrigeration circuit in which a second refrigerant circulates between a compression stage, a condensation stage, an expansion stage and an evaporation stage for submitting the second refrigerant to a refrigeration cycle, the evaporation stage being in direct heat-exchange relation with the heat-exchange unit of the climate control circuit such that the second refrigerant absorbs heat from the first refrigerant;
    sensors to monitor at least a temperature of the accumulator refrigerant, an outdoor temperature, and a cab/berth temperature;
    an energy level calculator associated with the sensors to calculate a required energy level of the energy accumulator as a function of temperature readings of the sensors; and
    an operation controller connected to the electric power source of the vehicle and connected to the energy level calculator, the operation controller being provided for one of (1) actuating the refrigeration circuit and the climate control circuit without the heating unit to store cold energy in the energy accumulator, and (2) actuating the climate control circuit with the heating unit to store hot energy in the energy accumulator, with operations (1) and (2) being selected as a function of the energy level of the energy accumulator and of the set point temperature, and for (3) actuating the climate control circuit to treat the fluid blown in the cab/berth by circulating the first refrigerant in the radiator.

5. The climate control system according to claim 4, further comprising a power level calculator connected to the operation controller so as to monitor a power level of the electric power source of the vehicle and indicate when any of operations (1), (2) and (3) is to be performed as a function of the power level of the electric power source.

6. The climate control system according to claim 5, wherein the power level calculator indicates that the operations (1) and (2) can be performed when the vehicle is running.

7. The climate control system according to claim 4, further comprising a power accumulator connected to the operation controller for accumulating electric power from the electric power source of the vehicle, whereby the climate control system is powered by the power accumulator when the vehicle is turned off.

8. The climate control system according to claim 7, further comprising a power level calculator connected to the operation controller so as to monitor a power level of the electric power source of the vehicle and indicate when electric power can be accumulated in the power accumulator as a function of the power level of the electric power source.

9. The climate control system according to claim 8, wherein the power level calculator is connected to the operation controller so as to monitor the power level of the electric power source of the vehicle and indicate when any of operations (1), (2) and (3) is to be performed as a function of the power level of the electric power source.

10. The climate control system according to claim 4, wherein the heating unit of the climate control circuit has a burner burning vehicle fuel to heat the first refrigerant.

11. The climate control system according to claim 4, wherein any one of the operations (1) and (2) performed by the operation controller are performed simultaneously with the operation (3).

12. The climate control system according to claim 4, wherein the accumulator refrigerant changes phase during one of the operations (1) and (2).

* * * * *